(12) United States Patent
Srinivasan et al.

(10) Patent No.: US 8,959,216 B2
(45) Date of Patent: *Feb. 17, 2015

(54) CHANNEL MANAGER FOR ACCESSING ELEMENTS FOR A SECURE WEB PAGE THROUGH A NON-SECURE CHANNEL

(75) Inventors: Suresh Srinivasan, Bangalore (IN); Amitabh Shukla, Deoghar (IN)

(73) Assignee: Oracle International Corporation, Redwood Shores, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 13/365,227

(22) Filed: Feb. 2, 2012

(65) Prior Publication Data

US 2012/0137000 A1 May 31, 2012

Related U.S. Application Data

(63) Continuation of application No. 12/496,594, filed on Jul. 1, 2009, now Pat. No. 8,131,822.

(51) Int. Cl.
*G06F 15/173* (2006.01)
*H04L 29/06* (2006.01)

(52) U.S. Cl.
CPC ................................. *H04L 63/105* (2013.01)
USPC ........... 709/225; 709/218; 709/219; 709/220; 709/203; 709/206; 713/150; 713/154

(58) Field of Classification Search
CPC .. H04L 63/105; H04L 63/0815; G06F 15/173
USPC ........... 709/218–225, 203–206; 713/150–201
See application file for complete search history.

(56) References Cited

U.S. PATENT DOCUMENTS

| | | | |
|---|---|---|---|
| 7,188,251 B1 | 3/2007 | Slaughter et al. | |
| 7,454,506 B2 | 11/2008 | Dutta | |
| 7,747,746 B2 * | 6/2010 | Thayer et al. | 709/225 |
| 7,840,690 B2 * | 11/2010 | Thayer et al. | 709/229 |
| 8,521,893 B2 * | 8/2013 | Park et al. | 709/230 |
| 2002/0112006 A1 * | 8/2002 | Kuriki et al. | 709/206 |
| 2003/0037142 A1 * | 2/2003 | Munger et al. | 709/225 |
| 2003/0159030 A1 * | 8/2003 | Evans | 713/154 |

(Continued)

OTHER PUBLICATIONS

HTTP Enforcer and RealURL Extension, obtained at http://typo3.org/documentation/document-library/extension-manuals/https_enforcer/1.0.12/view/1/4/; Jan. 29, 2009; 2 pages.

(Continued)

*Primary Examiner* — Razu Miah
(74) *Attorney, Agent, or Firm* — Trellis IP Law Group, PC

(57) ABSTRACT

Particular embodiments generally relate to allowing access of non-secure elements through a non-secure channel when a top-level page was accessed through a secure connection. In one embodiment, a webpage is accessed over a secure channel. The webpage includes secure and non-secure elements. When a non-secure element for the webpage is determined, a client may message with the server to open a non-secure channel for accessing the non-secure element. For example, the client may request port information in the request. The server then can respond with port information for a non-secure channel. The client then accesses data for the non-secure element through the non-secure channel using the port information.

20 Claims, 5 Drawing Sheets

(56) References Cited

U.S. PATENT DOCUMENTS

| | | | |
|---|---|---|---|
| 2003/0217291 A1* | 11/2003 | Schramm-Apple et al. | 713/201 |
| 2003/0229718 A1* | 12/2003 | Tock et al. | 709/246 |
| 2003/0229779 A1* | 12/2003 | Morais et al. | 713/153 |
| 2004/0117486 A1* | 6/2004 | Bourne et al. | 709/228 |
| 2004/0128538 A1* | 7/2004 | Gmuender et al. | 713/201 |
| 2004/0205149 A1 | 10/2004 | Dillon et al. | |
| 2005/0108517 A1* | 5/2005 | Dillon et al. | 713/150 |
| 2005/0188007 A1 | 8/2005 | Warner et al. | |
| 2005/0198491 A1* | 9/2005 | Lee et al. | 713/151 |
| 2007/0174454 A1* | 7/2007 | Mitchell et al. | 709/225 |
| 2007/0288247 A1* | 12/2007 | Mackay | 705/1 |
| 2008/0235236 A1* | 9/2008 | Olive | 707/10 |
| 2009/0281864 A1* | 11/2009 | Abercrombie et al. | 705/8 |
| 2009/0323648 A1* | 12/2009 | Park et al. | 370/338 |
| 2010/0049795 A1* | 2/2010 | Tock et al. | 709/203 |

OTHER PUBLICATIONS

SSL Tunneling for Non HTTP Protocol (Raw Socket), obtained at http://www.freelists.org/post/isalist/SSL-tunelling-for-non-HTTP-protocolraw-socket; Jan. 29, 2009; 1 page.

SSL Change to Unsecure Connection, obtained at http://www.experts-exchange.com/Networking/Protocols/Application_Protocols/SSL/Q_23189928.html?sfQueryTermInfo=1+rewriteengin; Jan. 29, 2009; 2 pages.

IBM Web-based System Manager Administrator Guide, A1X5L Version 5.3, obtained at http://publib.boulder.ibm.com/infocenter/pseries/v5r3/topic/com.ibm.aix.wsmadmn/doc/wsmadmn/wsmadmn.pdf; Fourth Edition; Nov. 2008; 76 pages.

IBM ISeries Secure Socket Layer, Version 5 Release 3, obtained at http://publib.boulder.ibm.com/infocenter/iseries/v5r3/topic/rzain/rzain.pdf; Fifth Edition; Aug. 2005; 29 pages.

* cited by examiner

CHANNEL MANAGER FOR ACCESSING ELEMENTS FOR A SECURE WEB PAGE THROUGH A NON-SECURE CHANNEL

CROSS REFERENCES TO RELATED APPLICATIONS

This application is a continuation of U.S. patent application Ser. No. 12/1496,594, entitled ACCESS OF ELEMENTS FOR A SECURE WEB PAGE THROUGH A NON-SECURE CHANNEL, which was filed on Jul. 1, 2009, and which is hereby incorporated by reference, as if it is set forth in full in this specification for ail purposes.

BACKGROUND

Particular embodiments generally relate to data communication and webpage processing.

When a top-level webpage is accessed securely over an encrypted connection, the entire page and all sub-elements can only be accessed using the secure connection. Thus, any element of the webpage that is requested incurs a performance hit because of the encryption and decryption that is required to communicate securely over the connection.

In another example, a webpage may be accessed over a non-secure connection. The webpage may include a link that uses a secure connection, such as a hypertext transfer protocol secure (HTTPS) connection, to another page. When the link is selected, the new page may be accessed over a secure connection. Once the new page is accessed, further communication to request elements on the new page is performed over the secure connection. Thus, once a secure connection is initiated, requests for elements on the new page are performed using the secure connection and performance hits may also be incurred.

SUMMARY

Particular embodiments generally relate to allowing access of non-secure elements through a non-secure channel when a top-level page was accessed through a secure connection. In one embodiment, a webpage is accessed over a secure channel. The webpage includes secure and non-secure elements. When a non-secure element for the webpage is determined, a client may message with the server to open a non-secure channel for accessing the non-secure element. For example, the client may request port information in the request. The server then can respond with port information for a non-secure channel. The client then accesses data for the non-secure element through the non-secure channel using the port information.

In one embodiment, a method is provided that comprises: accessing a web page over a secure channel, the web page including a plurality of elements including secure and non-secure elements; determining if an element in the plurality of elements is a non-secure element or secure element for the web page; if the element is a non-secure element, communicating with a server to open a non-secure channel for accessing the non-secure element, the non-secure channel being a different channel from the secure channel; and accessing data for the non-secure element through the non-secure channel.

In another embodiment, a method is provided that comprises: sending, from a first device, a web page over a secure channel, the web page including secure and non-secure elements; receiving a request from a second device to open a non-secure channel for accessing a non-secure element for the web page, the non-secure channel being a different channel from the secure channel; determining, at the first device, communication information for the non-secure channel, the communication information usable to communication through the non-secure channel; sending the communication information for the non-secure channel to the second device; receiving, from the second device, a request for data for the non-secure element through the non-secure channel using the communication information; and sending data for the non-secure element through the non-secure channel to the second device.

In yet another embodiment, a computer-readable storage medium comprising encoded logic for execution by the one or more processors is provided. The logic when executed is operable to: access a web page over a secure channel, the web page including a plurality of elements including secure and non-secure elements; determine if an element in the plurality of elements is a non-secure element or secure element for the web page; if the element is a non-secure element, communicate with a server to open a non-secure channel for accessing the non-secure element, the non-secure channel being a different channel from the secure channel; and access, using the one or more processors, data for the non-secure element through the non-secure channel.

In another embodiment, a computer-readable storage medium comprising encoded logic for execution by the one or more processors is provided. The logic when executed is operable to: send, from a first device, a web page over a secure channel, the web page including secure and non-secure elements; receive a request from a second device to open a non-secure channel for accessing a non-secure element for the web page, the non-secure channel being a different channel from the secure channel; determine, at the first device, communication information for the non-secure channel, the communication information usable to communication through the non-secure channel; send the communication information for the non-secure channel to the second device; receive, from the second device, a request for data for the non-secure element through the non-secure channel using the communication information; and send data for the non-secure element through the non-secure channel to the second device.

A further understanding of the nature and the advantages of particular embodiments disclosed herein may be realized by reference of the remaining portions of the specification and the attached drawings.

DETAILED DESCRIPTION OF EMBODIMENTS

Figure 1:
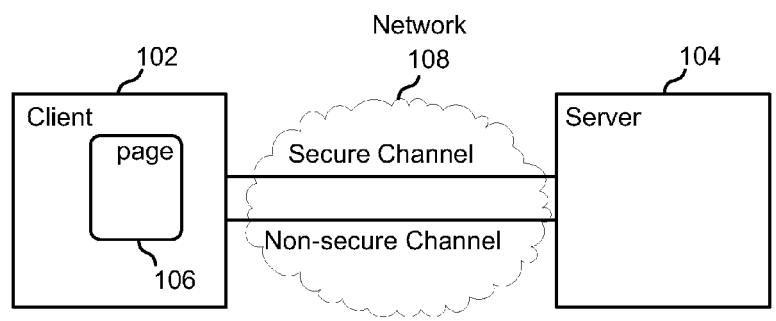
FIG. 1 depicts a system for accessing non-secure elements or a non-secure channel according to one embodiment.

FIG. 1 depicts a system 100 for accessing non-secure elements or a non-secure channel according to one embodiment. System 100 includes a client 102 and server 104. Client 102 and server 104 may communicate over a network 108, which may include various network devices that are not shown.

Client 102 may be a computing device that is used to display a page 106. Examples of client 102 may include a personal computer, laptop computer, cellular phone, smart phone, or any other device that can display page 106.

Server 104 may be a computing device that can send information for page 106 to client 102. In one example, server 104 is a web server. Network 108 may be any network including the Internet, a wireless network, a wired network, or any combination thereof.

Page 106 may include any type of information that can be displayed. In one embodiment, page 106 is a web page. Page 106 may be displayed using software code that is interpreted and used to display page 106. In one example, the software code may be hypertext transfer markup language (HTML). It will be recognized that other software languages may be used, such as extensible markup language (XML), or other markup/software languages. When page 106 is referred to, it may be the software code or the content that is displayed. For example, the software code may be processed to display the content of the page as is known in the art.

Client 102 and server 104 may communicate through a communication channel. A channel may be any connection that is used to communicate requests and responses for page 106. A channel may use different protocols to transfer data, such as transfer control protocol (TCP), user datagram protocol (UDP), or Internet protocol (IP).

A secure channel is a channel for transferring data that is resistant to interception and tampering. For example, a secure channel may use an encryption mechanism that encrypts data to be sent over the secure channel and then at the other end the encrypted data is decrypted. The encryption and decryption of the data requires processing resources to be used that are not necessary if a non-secure channel is used. That is, the data when sent over the non-secure channel does not need to be encrypted and decrypted. However, the non-secure channel may be more susceptible to interception of the data because it is an unencrypted channel.

Figure 2:
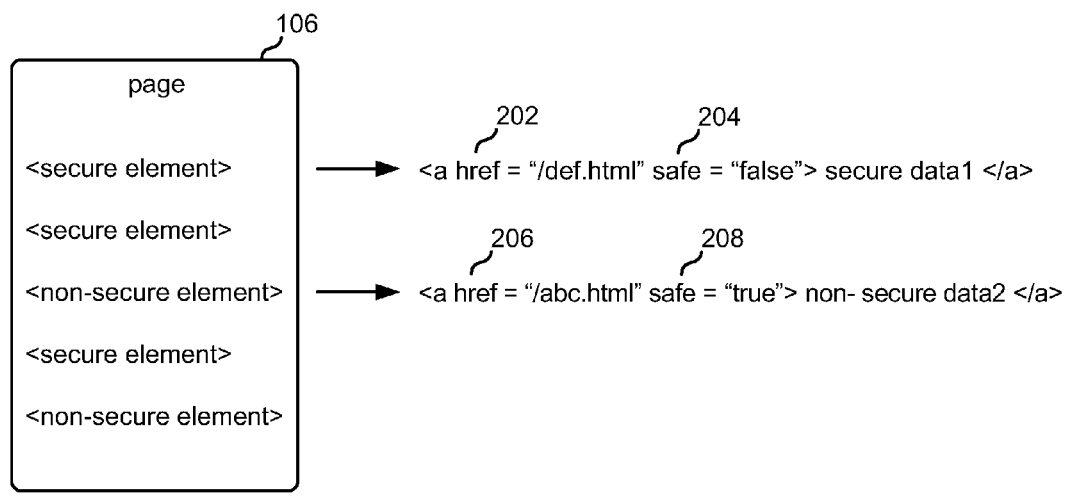
FIG. 2 depicts an example of a page according to one embodiment.

FIG. 2 depicts an example of page 106 according to one embodiment. Page 106 may include secure elements and non-secure elements. An element may be defined by the software language used for page 106. For example, HTML includes different elements that may indicate structure in the HTML document and a way of hierarchically arranging content for the page. Some elements, such as resource elements, may be elements in which additional data is requested from server 104. Examples of resource elements include <a>, <script>, <link>, etc. For example, when a <link> element is encountered, a hypertext link may be displayed on page 106 and when the link selected by a user, a new page is requested using the link.

Particular embodiments allow non-secure elements of page 106 to be accessed over a non-secure channel even if page 106 was accessed securely over the secure channel. Conventionally, if page 106 was accessed securely over the secure channel, then any sub-elements in page 106 were accessed over the secure channel. However, particular embodiments communicate to open a non-secure channel in which non-secure elements can be requested.

To indicate whether an element is secure or non-secure, an extension to the software language, such as an attribute, may be used to indicate whether an element is secure or not. For example, a safe attribute may be added to a non-secure element to indicate that it can be accessed over the non-secure channel. For example, the extension attribute may be "safe" with a value of "true". It will be understood that other extension attributes and values may be used to indicate a non-secure channel. This attribute may be an extension of HTML or another language. Client 102 and server 104 may be configured to interpret the new element when it is encountered.

An example of a secure element is shown at 202. As shown, an attribute 204 of "safe" is equal to "false". In this case, if the secure element is selected, client 102 may request the content of def.html from server 104 using the secure channel. Because safe is equal to false, the sub-element is considered a secure element and the content should be requested over the secure channel. A non-secure element 206 is shown for requesting content of abc.html. The safe attribute 208 is equal to "true", and when client 102 encounters this attribute, it determines that this sub-element should be requested over a non-secure channel from server 104. A non-secure communication path may first need to be opened up though. The non-secure channel is opened up and data for the non-secure element is requested through the channel. This process is explained in more detail below.

Figure 3:
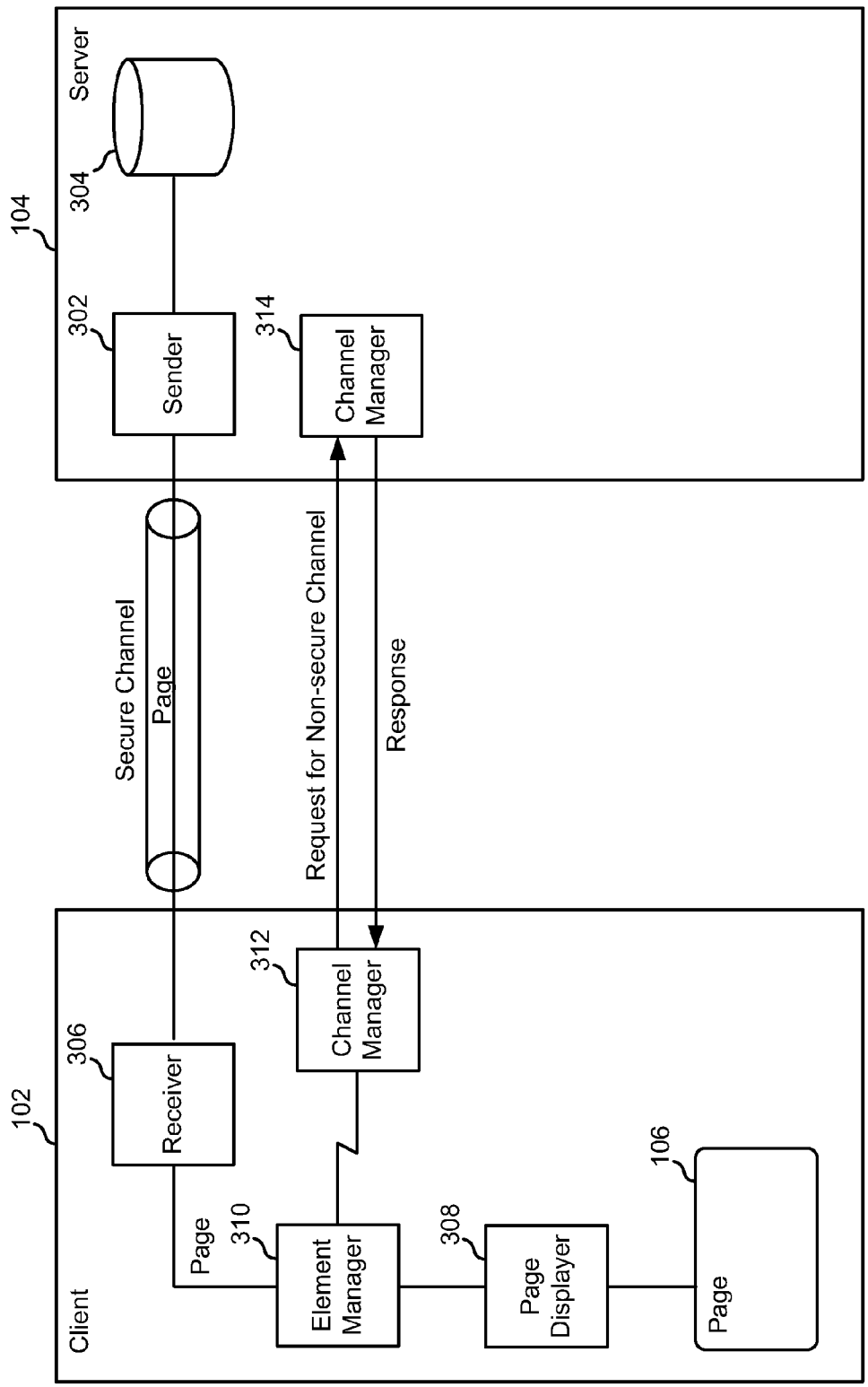
FIG. 3 shows a more detailed embodiment of a client and a server according to one embodiment.

FIG. 3 shows a more detailed embodiment of client 102 and server 104 according to one embodiment. In one embodiment, modules or plug-ins may be provided in client 102 and server 104 to provide the functionality. The modules may be configured to interpret the safe attribute as an extension of HTML.

In server 104, a sender 302 may send page 106 through the secure channel to client 102. The page may be requested by client 102 and server 104 retrieves the page from storage 304 for sending to client 102. In one embodiment, this may be considered a top level page or home page. Other content, such as web pages, may be accessed through the home page. Multiple levels of web pages may be found in a hierarchy that is based on the top level page. Any pages accessed on one of the levels may be considered a child of the home page.

At client 102, a receiver 306 receives page 106 and a page displayer 308 can display the page on client 102. Page 106 may be displayed on any type of interface or display. The page is displayed by parsing elements in code for page 106 and displaying content corresponding to the elements.

An element manager 310 also may determine if elements of page 106 are secure or non-secure elements. For example, when a non-secure element is determined (e.g., by selection of the element by the user or by parsing of the web page), element manager 310 determines whether or not the element should be requested over the non-secure channel. For example, the non-secure element may be a hypertext transfer protocol (HTTP) link that user may select. When the link is selected, a new page may need to be requested from server 104. If the element for the link includes an attribute of safe="true", element manager 310 determines if a non-secure channel needs to be opened.

A channel manager 312 then can determine whether or not a request to open a non-secure channel should be made to server 104. The request may be made if a non-secure channel has not already been opened.

If a non-secure channel needs to be opened, channel manager 312 may then generate a request for the non-secure channel. The request may seek port information that may be used to communicate through the non-secure channel. For example, port information may be requested using an HTTP extension header that includes a host name. The host name may be a unique name assigned to a host computer. For example, the host name may be a domain name that is assigned to server 104. An example of the request may be X-HTTP-connection: Host name. The hostname may be a preferred host that may serve the connection. In the event of absence of such a hostname listening on a non-secure channel, server 104 may provide another hostname that it believes (through configuration) to be able to serve the request. It should be noted other methods may be used in a negotiation to open up a non-secure channel (i.e., request a non-secure port). For example, extensible markup language (XML) may be used to request information from server 104 to open up a non-secure channel.

A channel manager 314 at server 104 receives the request and can respond with information needed to open up the non-secure channel. For example, a response may include the non-secure host and port information using the same extension header. An example of the response may be X-HTTP-connection: Host name: port 80. The host name may be the local IP address. This local IP address and port number may be considered a socket that is configured to allow communication through the non-secure channel. If channel manager 314 does not have a non-secure socket configured for the host that the client is seeking information for, server 104 responds with an indication that the non-secure channel is not available. For example, a "not available" value may be added in the response. In this case, client 102 may request the content using the original secure channel (i.e., the secure host port).

Figure 4:
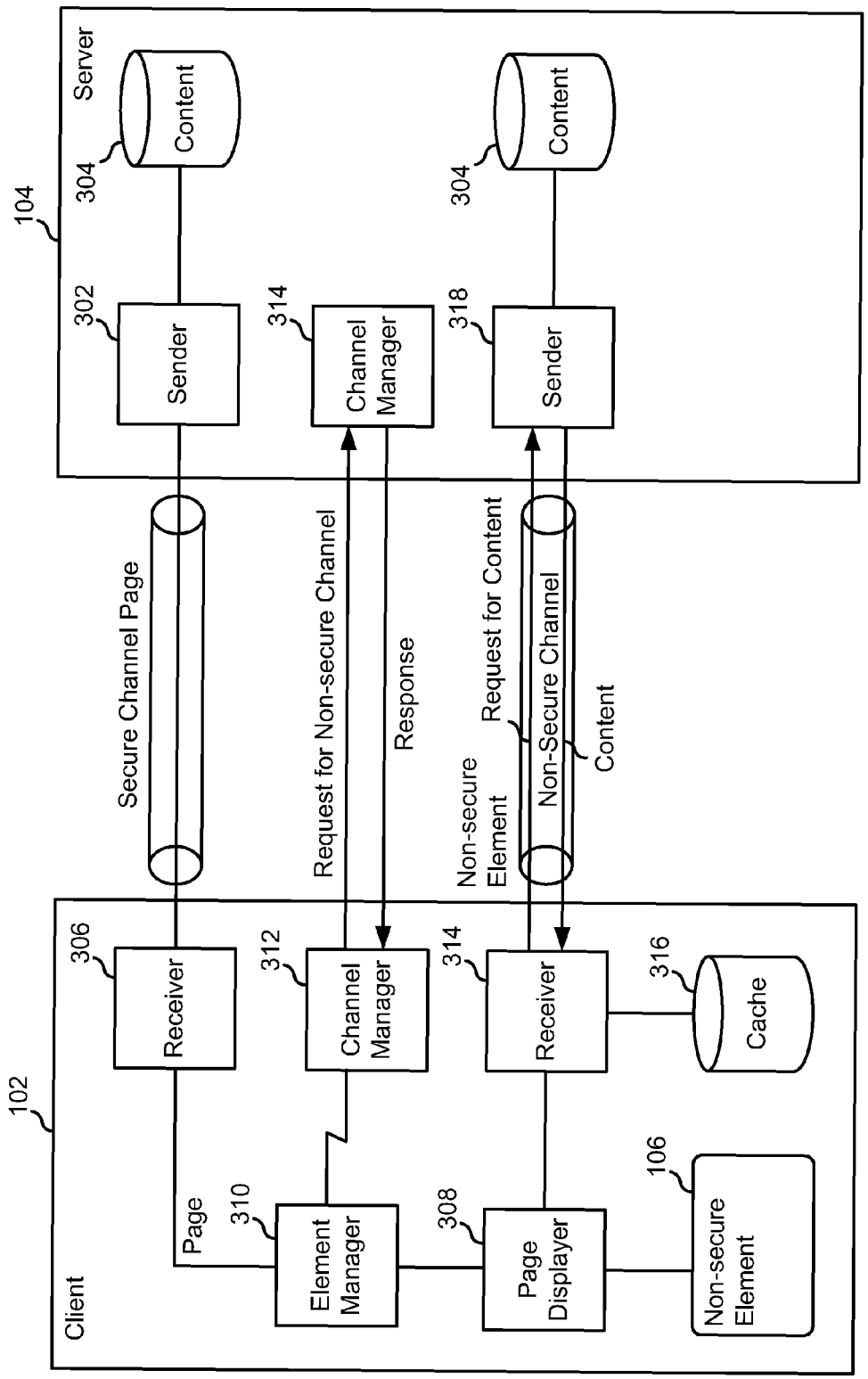
FIG. 4 shows a more detailed embodiment of the client and the server for requesting content over the non-secure channel according to one embodiment.

After receiving the information for the non-secure channel, client 102 may request the content (e.g., the new web page). FIG. 4 shows a more detailed embodiment of client 102 and server 104 for requesting content over the non-secure channel according to one embodiment. The request may be sent through the non-secure channel for the non-secure element. Sender 318 may retrieve content for the request from storage 304 and send it to a receiver 314.

Page displayer 308 then displays the content for the non-secure element. For example, a new page 106 may be displayed with the content received. Also, a portion of the original page may be replaced with the new content. For example, the content may be displayed in a frame of page 106. Receiver 314 may then store the content in a cache 316 for later display if the content is requested again.

The non-secure channel information may be stored in cache 316 such that it can be used to request all non-secure elements in page 106. Also, non-secure elements in other pages that may be subsequently displayed may be requested using the non-secure channel. The information may be cached for as long as the duration of the original top-level secure connection is kept alive.

As additional elements from page 106 are requested, data for secure elements may be requested through the secure channel and data for non-secure elements are requested through the non-secure channel. After the non-secure channel information is received, additional requests for connection information do not need to be made. Rather, the request may be automatically made through the non-secure channel. In this case, a secure channel and non-secure channel have been opened simultaneously. This may be different from receiving a page over a non-secure channel and then opening up a secure channel when an HTTPS link is selected. In this case, once the HTTPS page is opened, any other requests for elements of that page are sent over the secure channel.

Figure 5:
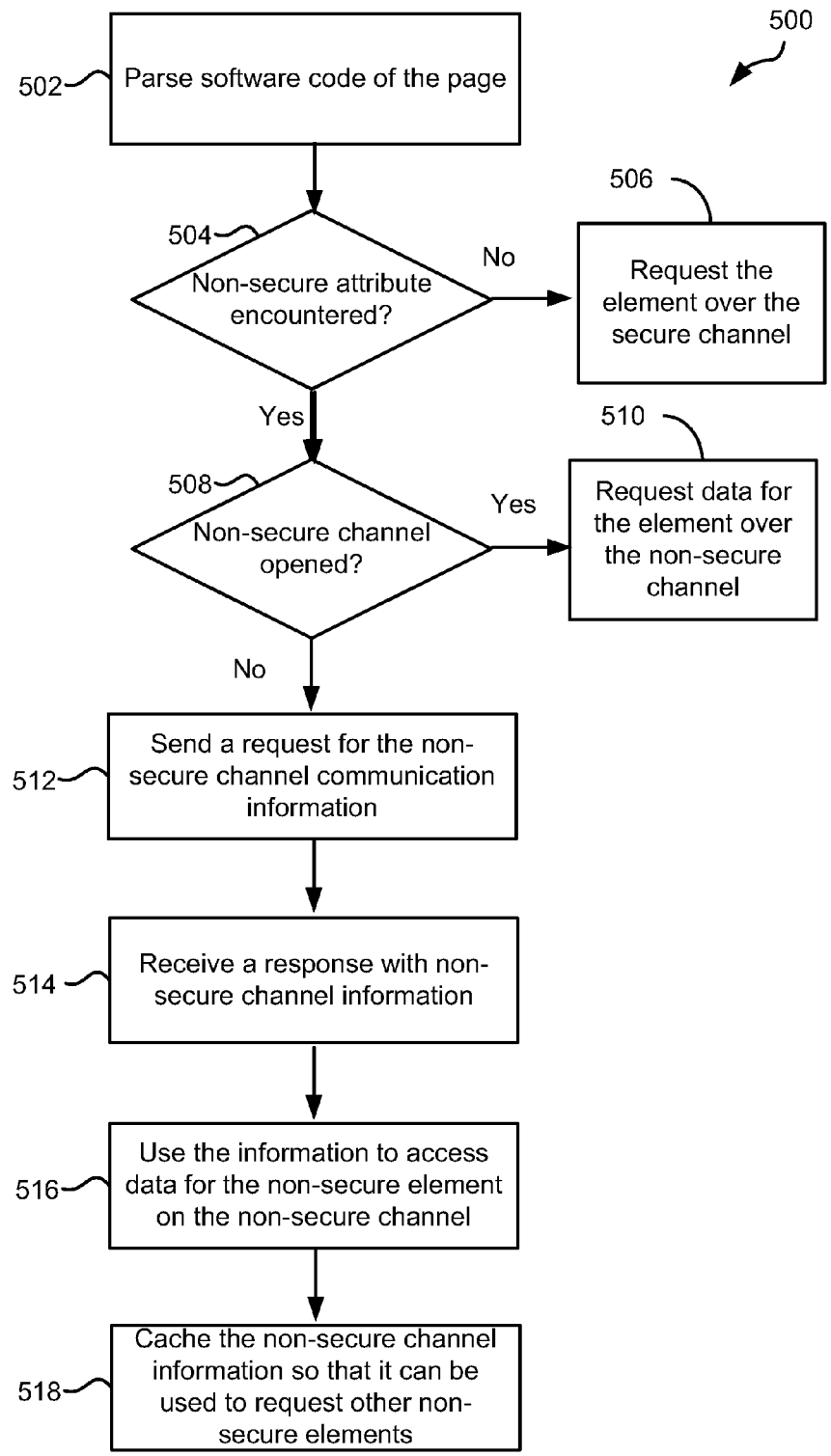
FIG. 5 depicts a simplified flowchart from the perspective of the client according to one embodiment.

FIG. 5 depicts a simplified flowchart 500 from the perspective of client 102 according to one embodiment. The steps described in FIG. 5 may be implemented using a programmed computer. Logic to perform the steps may be encoded in one or more tangible media for execution by one or more computer processors. The logic may cause the computer to perform the functions described herein.

Step 502 parses software code of page 106. For example, when an element displayed on page 106 is selected, code for that element may be parsed.

Step 504 determines if the selected element includes a non-secure attribute. For example, a safe attribute, which may be an extension to HTML, may be encountered. It is then determined if the value for the safe attribute indicates this is a non-secure element (e.g., a "true" value). If it is not a non-secure element, then step 506 requests the element over the secure channel.

If the non-secure attribute is "true", step 508 determines if the non-secure channel has been opened. For example, a non-secure channel may have already been opened and the information needed to communicate over the non-secure channel does not need to be requested again. If the non-secure channel has been opened, step 510 requests data for the element over the non-secure channel using the non-secure channel communication information.

If the non-secure channel has not been opened, step 512 sends a request for the non-secure channel communication information. The request may include a host name that is seeking port information for the non-secure channel.

Step 514 receives a response with non-secure channel information. For example, a non-secure host and port information may be received.

Step 516 then uses the information to access data for the non-secure element on the non-secure channel. For example, a request for content is sent over the non-secure channel using the port information. The request that is sent may be formatted per the protocol that is used for the channel. For example, HTTP may be the protocol that was agreed upon in the negotiation for opening up the non-secure channel. Thus, the port and protocol are used to send information to access the data through the non-secure channel.

Step 518 caches the non-secure channel information so that it can be used to request other non-secure elements.

Figure 6:
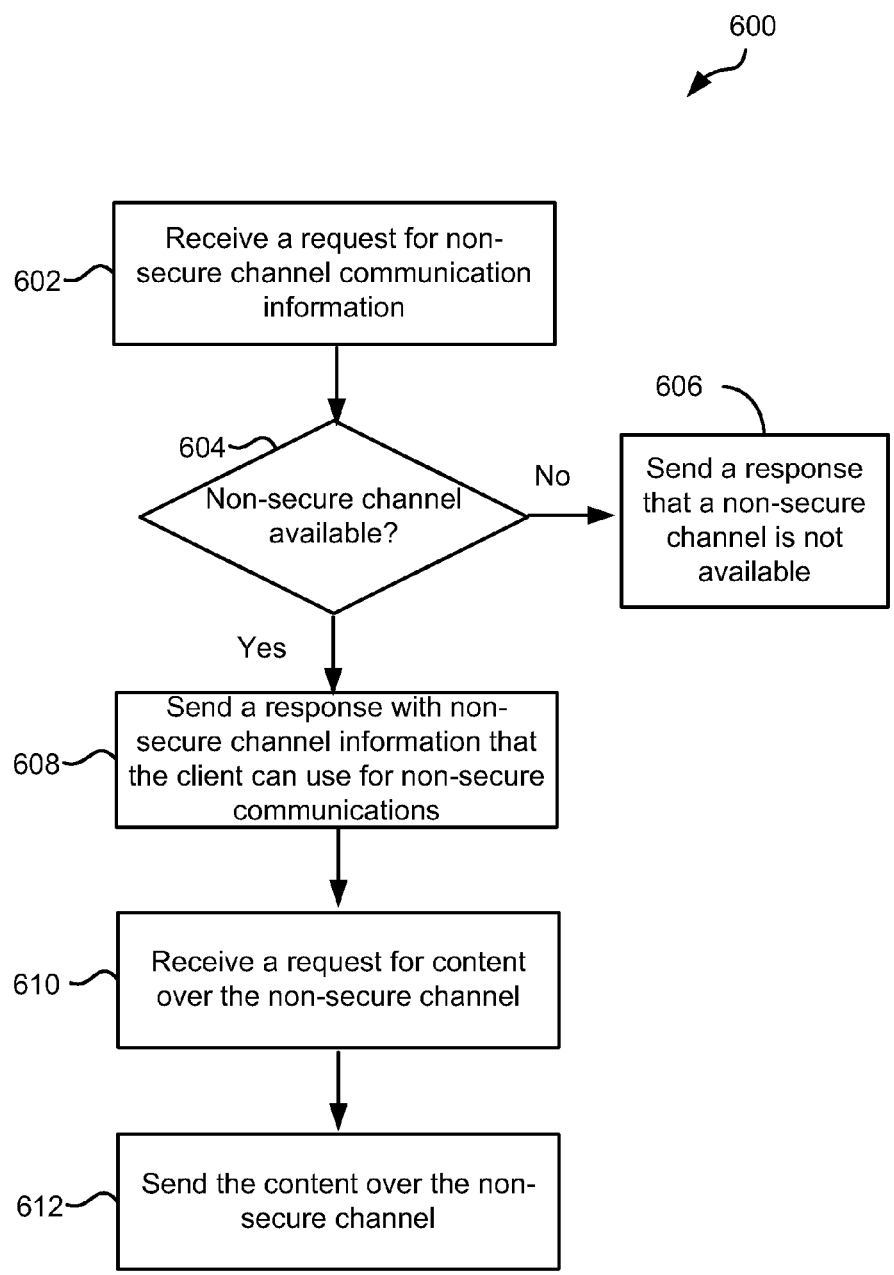
FIG. 6 depicts a simplified flowchart of a method performed with the perspective of the server according to one embodiment.

FIG. 6 depicts a simplified flowchart 600 of a method performed with the perspective of server 104 according to one embodiment. The steps described in FIG. 6 may be implemented using a programmed computer. Logic to perform the steps may be encoded in one or more tangible media for execution by one or more computer processors. The logic may cause the computer to perform the functions described herein.

Step 602 receives a request for non-secure channel communication information.

Step 604 determines if a non-secure channel is available. For example, server 104 may not have a non-secure socket configured for the virtual host that client 102 is seeking information for. If a secure channel is not available, step 606 sends a response that a non-secure channel is not available.

If a non-secure channel is available, step 608 sends a response with non-secure channel information that client 102 can use for non-secure communications. This may include a host and port information.

Step 610 receives a request for content over the non-secure channel. Step 612 then sends the content over the non-secure channel.

Particular embodiments provide many advantages. For example, flexibility in handling of elements in a webpage may allow for better performance by way of reduced computations at both the client and the server end. A choice can be made as the whether to request elements through a secure or non-secure channel. When encryption and decryption is not needed, a non-secure channel is used. Particular embodiments may maintain both a secure and non-secure channel at the same time. This allows for both secure and non-secure elements to be requested while a top level web page connection is open.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used.
Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method executed in a network by a channel manager coupled to the network, wherein data for a web page is received at a device over a secure channel, wherein the web page includes secure and non-secure elements, the method comprising:
receiving a communication indicating whether a selected element of a web page is secure or non-secure;
determining whether to initiate opening of a non-secure channel between a client and server based on the communication, wherein the non-secure channel is a different channel from the secure channel; and
sending a signal to allow the device to access data for the non-secure element through the non-secure channel.

2. The method of claim 1, wherein allowing further includes selectively providing a request, to a server, to open a non-secure channel in response to determining.

3. The method of claim 2, wherein receiving a communication further includes receiving the communication from an element manager in response to the element manager accessing information about the selected element.

4. The method of claim 3, wherein the information about the selected element is provided via an extension or attribute of a markup language statement.

5. The method of claim 4, wherein the markup language includes HyperText Markup Language (HTML).

6. The method of claim 3, wherein determining further includes determining whether a non-secure channel between a client and server is already opened.

7. The method of claim 6, further including initiating opening of a non-secure channel between the client and server when the communication indicates that a selected web page element is a non-secure element and when a non-secure channel between the client and server is not already opened.

8. The method of claim 7, wherein initiating opening includes providing a request to the server for non-secure channel information.

9. The method of claim 8, further including receiving port information from a server in response to the request when a non-secure socket is available at the server.

10. The method of claim 9, wherein receiving port information includes receiving port information at a channel manager of the client from a channel manager of the server.

11. The method of claim 10, wherein receiving port information further includes receiving, via a markup language extension header, an indication of a non-secure host.

12. The method of claim 11, wherein the indication of a non-secure host includes a local Internet Protocol (IP) address and port number of a non-secure host for serving the non-secure channel.

13. The method of claim 12, wherein the local IP address and port number together represent a socket that is configured to allow communication through a non-secure channel between the client and server.

14. The method of claim 6, further including receiving an indication that a new non-secure channel is not available at the server when the request for a new non-secure channel is not fulfilled by the server.

15. The method of claim 7, further including sending a communication to a server indicating that communications between a server and client and server, pertaining to the selected element, are to occur over a non-secure channel.

16. The method of claim 15, further including directing requests for content for a non-secure element over the non-secure channel to the server.

17. The method of claim 2, further including enabling storage of non-secure channel information in a cache, thereby enabling future use of the non-secure channel for non-secure elements in a web page.

18. The method of claim 2, further including:
receiving a response to the request from the server, wherein the response includes non-secure channel information;
using the non-secure channel information to access data for a non-secure element, corresponding to the selected element, on the non-secure channel; and
caching the non-secure channel information so that it can be used to request other non-secure elements.

19. An apparatus comprising:
  a digital processor coupled to a display and to a processor-readable storage device, wherein the processor-readable storage device includes one or more instructions executable by the digital processor to perform the following acts:
  receiving a communication indicating whether a selected element of a web page is secure or non-secure;
  determining whether to initiate opening of a non-secure channel between a client and server based on the communication, wherein the non-secure channel is a different channel from the secure channel; and
  sending a signal to allow the device to access data for the non-secure element through the non-secure channel.

20. A non-transitory processor-readable storage medium including instructions executable by one or more digital processors, with the one or more digital processors included in a channel manager on a client device coupled to a network, to perform the following acts:
  receiving a communication indicating whether a selected resource element of the web page is a secure resource element or a non-secure resource element, where an indication is based on a value of a mark-up language extension, wherein the client device receives data for a web page over a secure channel between the client device and a server and wherein the web page is displayed on the client device, wherein the web page includes resource elements which require extra data from the server, wherein resource elements include secure and non-secure resource elements, wherein selection of a secure resource element requires that extra data be transferred from the server using the secure channel and selection of a non-secure element does not require that extra data be transferred from the server using the secure channel;
  opening a non-secure channel between the client device and the server if the communication indicates selection of a non-secure resource element, wherein the non-secure channel is a different channel from the secure channel; and
  requesting, over the secure channel, the extra data required by selection of the non-secure resource element.

* * * * *

UNITED STATES PATENT AND TRADEMARK OFFICE
CERTIFICATE OF CORRECTION

PATENT NO.        : 8,959,216 B2  
APPLICATION NO.   : 13/365227  
DATED             : February 17, 2015  
INVENTOR(S)       : Suresh Srinivasan et al.

It is certified that error appears in the above-identified patent and that said Letters Patent is hereby corrected as shown below:

Specification

Column 1 Line 9: AFTER "Ser. No.;" DELETE "12/1496,594," and INSERT --12/496,594,--  
Column 1 Line 13: AFTER "in the specification for" DELETE "ail" and INSERT --all--

Claims

Column 7-9: DELETE CLAIMS 1-19 and REPLACE WITH THE FOLLOWING:
1. A method executed in a network by a channel manager on a client device coupled to the network, wherein data for a web page is received at the client device over a secure channel between the client device and a server and wherein the web page is displayed on the client device, wherein the web page includes resource elements which require extra data from the server, wherein resource elements include secure and non-secure resource elements, wherein selection of a secure resource element requires that the extra data be transferred from the server using the secure channel and selection of a non-secure element does not require that the extra data be transferred from the server using the secure channel, the method, performed by one or more processors in the client device, comprising:
  receiving, using the one or more processors, a communication indicating whether a selected resource element of the web page is a secure resource element or a non-secure resource element, where an indication is based on a value of a mark-up language extension;
  opening, using the one or more processors, a non-secure channel between the client device and the server if the communication indicates selection of a non-secure resource element, wherein the non-secure channel is a different channel from the secure channel; and
  requesting, over the secure channel and using the one or more processors, the extra data required by selection of the non-secure resource element.

2. The method of claim 1 with opening further comprising:
providing a request, to the server, to open a non-secure channel.

Signed and Sealed this  
Nineteenth Day of April, 2016

Michelle K. Lee  
*Director of the United States Patent and Trademark Office*

Claims

3. The method of claim 2 wherein receiving a communication further comprises:
receiving the communication from an element manager in response to the element manager accessing information about the selected resource element.

4. The method of claim 3 wherein the information about the selected resource element is provided via an extension or attribute of a markup language statement.

5. The method of claim 4 wherein the markup language includes HyperText Markup Language (HTML).

6. The method of claim 3 wherein opening further comprises:
determining whether a non-secure channel between the client device and the server is open before providing the request to the server to open a non-secure channel.

7. The method of claim 6 where opening further comprises:
opening of a non-secure channel between the client device and the server when the communication indicates that a selected resource element is a non-secure element and when a non-secure channel between the client device and the server is not already open.

8. The method of claim 7 wherein opening further comprises:
providing a request to the server for non-secure channel information.

9. The method of claim 8 further comprising:
receiving port information from the server in response to the request when a non-secure socket is available at the server.

10. The method of claim 9 wherein receiving port information further comprises:
receiving port information at the channel manager of the client device from a channel manager of the server.

11. The method of claim 10 wherein receiving port information further comprises:
receiving, via a markup language extension header, an indication of a non-secure host.

12. The method of claim 11 wherein the indication of a non-secure host includes a local Internet Protocol (IP) address and port number of a non-secure host for serving the non-secure channel.

13. The method of claim 12 wherein the local IP address and port number together represent a socket that is configured to allow communication through a non-secure channel between the client device and the server.

14. The method of claim 6 further comprising:
receiving an indication that a new non-secure channel is not available at the server when the request for a non-secure channel is not fulfilled by the server.

Claims

15. The method of claim 7 further comprising:
sending a communication to a server indicating that communications between a server and client and server, pertaining to the selected element, are to occur over a non-secure channel.

16. The method of claim 15 further comprising:
directing requests for content for a non-secure resource element over the non-secure channel to the server.

17. The method of claim 1 further comprising:
enabling storage of non-secure channel information in a cache, thereby enabling future use of the non-secure channel for non-secure resource elements in the web page.

18. The method of Claim 2 further comprising:
  receiving a response to a request, wherein the response includes non-secure channel information;
  using the non-secure channel information to access data required by a non-secure resource element on the non-secure channel; and
  caching the non-secure channel information so that it can be used to service requests of other non-secure elements.

19. A channel manager on a client device coupled to a network, wherein the client device receives data for a web page over a secure channel between the client device and a server and wherein the web page is displayed on the client device, wherein the web page includes resource elements which require extra data from the server, wherein resource elements include secure and non-secure resource elements, wherein selection of a secure resource element requires that extra data be transferred from the server using the secure channel and selection of a non-secure resource element does not require that extra data be transferred from the server using the secure channel, the channel manager comprising:
a digital processor coupled and to a non-transitory processor readable storage device,
wherein the non-transitory processor readable storage device includes one or more instructions executable by the digital processor to perform the following acts:
  receiving a communication indicating whether a selected resource element of the web page is secure or non-secure;
  receiving a communication indicating whether a selected resource element of the web page is a secure resource element or a non-secure resource element, where an indication is based on a value of a mark-up language extension;
  opening a non-secure channel between the client device and the server if the communication indicates selection of a non-secure resource element, wherein the non-secure channel is a different channel from the secure channel; and
  requesting, over the non-secure channel, the extra data required by selection of the non-secure resource element.

Column 10 Line 12 CLAIM 20: DELETE "reguire" and INSERT --require--